United States Patent [19]
Riggle

[11] Patent Number: 5,887,488
[45] Date of Patent: Mar. 30, 1999

[54] VEHICULAR ACCELERATOR PEDAL APPARATUS

[75] Inventor: Russell K. Riggle, Newcomerstown, Ohio

[73] Assignee: IMO Industries, Inc., Hudson, Ohio

[21] Appl. No.: 842,804

[22] Filed: Apr. 16, 1997

[51] Int. Cl.⁶ .................................................. G05G 1/14
[52] U.S. Cl. ............................................ 74/514; 123/399
[58] Field of Search .......................... 74/514, 513, 560; 123/399; 180/335; 338/153, 47, 108, 113

[56] References Cited

U.S. PATENT DOCUMENTS

| | | | |
|---|---|---|---|
| 4,087,776 | 5/1978 | Donato | 338/198 |
| 4,123,740 | 10/1978 | Palmer et al. | 338/67 |
| 4,528,590 | 7/1985 | Bisacquino et al. | 338/153 |
| 4,735,183 | 4/1988 | Inoue et al. | 123/399 |
| 4,915,075 | 4/1990 | Brown | 123/399 |
| 4,958,607 | 9/1990 | Lundberg | 74/513 X |
| 4,976,166 | 12/1990 | Davis et al. | 74/512 |
| 5,063,811 | 11/1991 | Smith et al. | 74/513 |
| 5,133,225 | 7/1992 | Lundberg et al. | 74/560 |
| 5,133,321 | 7/1992 | Hering et al. | 123/399 |
| 5,237,891 | 8/1993 | Neubauer et al. | 74/560 |
| 5,241,936 | 9/1993 | Byler et al. | 74/513 X |
| 5,321,980 | 6/1994 | Hering et al. | 73/118.1 |
| 5,507,201 | 4/1996 | Fairbairn et al. | 74/514 X |

FOREIGN PATENT DOCUMENTS

| | | |
|---|---|---|
| 3612905 A1 | 10/1987 | Germany . |
| 99729 | 6/1985 | Japan .................................... 74/513 |

*Primary Examiner*—Charles A Marmor
*Assistant Examiner*—Mary Ann Battista
*Attorney, Agent, or Firm*—Jansson, Shupe, Bridge & Munger, Ltd.

[57] ABSTRACT

A vehicular accelerator pedal apparatus for electronic control of vehicle engine speed. The apparatus has a pedal position sensor with a rotatable stem, an accelerator pedal and an actuator bar extending from the pedal toward the sensor mounting bracket. In the improvement, the actuator bar is connected to a drive shaft which is pivot-mounted on the bracket. An actuator linkage is coupled to and pivoted by the drive shaft and extends between such the drive shaft and the sensor stem. The linkage includes first and second links imparting rotary motion to the stem when the linkage is pivoted by movement of the pedal. The second link is available in several different lengths and the apparatus thereby accommodates each of several different sensors by using a second link having the length appropriate for a particular sensor.

12 Claims, 10 Drawing Sheets

VEHICULAR ACCELERATOR PEDAL APPARATUS

FIELD OF THE INVENTION

This invention relates generally to internal combustion engines and, more particularly, to such vehicular-mounted engines having an electrical device between the accelerator pedal and the engine speed regulator.

BACKGROUND OF THE INVENTION

Almost from the advent of the first motor vehicle powered by an internal combustion engine, engine speed control has been effected by an accelerator pedal mechanically coupled through the vehicle fire wall to an engine "speed regulator" such as a carburetor. When no pressure was applied to the pedal, the engine ran at some preset idle speed. And when vehicle-accelerating pressure was applied to the pedal, the pedal/carburetor linkage opened passages in the carburetor to admit more fuel to the engine. The linkage was "custom-configured" for the particular vehicle, engine and carburetor.

Much more recently, engine and vehicle manufacturers have turned to electrical and electronic engine speed control systems which sense engine temperature, engine load and the like and automatically control pump-fed fuel injectors to cause the proper amount of fuel to be admitted to the engine. Such systems are vastly more flexible in the way they can be installed in the vehicle and applied to the engine.

As but one example of improved flexibility in application, it is no longer required to extend a mechanical linkage through the vehicle firewall and provide appropriate sealing devices to prevent air leakage into the passenger compartment. Rather, electrical wires can be extended from the accelerator pedal mechanism to the electronic speed control on the engine.

A typical electrical engine throttle control system uses an electrical sensor, the output signal of which is a function of the position of the accelerator pedal. That is, the sensor "senses" pedal position between idle speed and maximum engine speed and the resulting signal is used by the electronic engine speed control system for engine speed regulation. A common sensor is embodied as a potentiometer or "pot" having a rotating stem. As the accelerator pedal is depressed and released, the stem rotates and an appropriate output signal results.

Examples of arrangements having an accelerator pedal and a sensor coupled thereto are disclosed in U.S. Pat. Nos. 4,958,607 (Lundberg); 4,976,166 (Davis et al.); 5,133,225 (Lundberg et al.); 5,237,891 (Neubauer et al.); 5,241,936 (Byler et al.) and 5,321,980 (Hering et al.). U.S. Pat. No. 5,133,321 (Hering et al.) discloses a resistive-type throttle control and idle-validation sensor combined into a single component.

While earlier arrangements have been generally satisfactory for the intended use, they are not without disadvantages. A notable disadvantage is that the pedal assembly hardware must be configured to accommodate a particular sensor made by a particular manufacturer. For example, the combined control and validation sensor disclosed in the above-noted Hering et al. patent is to be used with Cummins CELECT™ electronic fuel control system. The patent goes on to explain that the sensor may be "adapted" to operate with a variety of control systems and control devices.

Yet another apparent disadvantage is based upon the understanding that the arrangement of the Byler et al. patent uses a single sensor which may be adapted to any one of several different engines and engine control systems. But engine and vehicle builders may wish to use their own sensor or one specified by them rather than one supplied by the manufacturer of the pedal hardware.

It is most preferable that an electronic accelerator pedal assembly be mounted on the front wall, often referred to as the fire wall, of the passenger compartment. The arrangements shown in the above-noted Byler et al. and Lundberg patents mount in that fashion. But those shown in the above-noted Davis et al. and Lundberg et al. patents mount adjacent to the floor where they are more susceptible to damage by water, dirt, foot-borne road salt and the like.

Yet another disadvantage of some prior art arrangements is that the accelerator pedal is biased to the engine idle position by a single spring. The apparatus shown in the above-noted Hering et al. patent is a example. But if the single spring fails, the pedal may move to a position representing some engine speed above idle, not a desirable condition.

The arrangement shown in the above-noted Byler et al. patent has pedal-biasing springs which are coiled flat ribbons and which are confined in a drum-like enclosure. If they become wet, such springs dry less easily than exposed springs and are not easily replaced. And, seemingly, manufacturing tooling for such arrangement may be more costly than is necessary in view of the invention.

An improved vehicular accelerator pedal apparatus which addresses disadvantages of prior art arrangements would be an important technical advance.

OBJECTS OF THE INVENTION

It is an object of the invention to provide an improved vehicular accelerator pedal apparatus which overcomes some of the problems and shortcomings of the prior art.

Another object of the invention is to provide such an accelerator pedal apparatus which may be easily configured to accommodate a variety of electrical sensors without modifying such sensors.

Another object of the invention is to provide such an accelerator pedal apparatus which mounts on a vehicle fire wall.

Another object of the invention is to provide such an accelerator pedal apparatus which readily accommodates any one of several sensors preferred by engine and vehicle builders.

Yet another object of the invention is to provide such an accelerator pedal apparatus which is of open construction and, therefore, easy to inspect and repair.

Another object of the invention is to provide such an accelerator pedal apparatus which involves reduced tooling expenditures for manufacture.

Still another object of the invention is to provide such an accelerator pedal apparatus which has redundant springs biasing the pedal to an engine-idle position. How these and other objects are accomplished will become apparent from the following descriptions and from the drawings.

SUMMARY OF THE INVENTION

The invention involves a vehicular accelerator pedal apparatus of the type which provides an electrical signal which represents the position of the pedal between idle speed and some maximum speed. The apparatus is used with electronic engine controls for controlling engine speed.

The apparatus has (a) a pedal position sensor, e.g., a potentiometer or "pot", mounted with respect to a bracket.

The pot has a stem rotatable about an axis of rotation. An actuator bar extends from the pedal toward the bracket.

In the improvement, the actuator bar is connected to a drive shaft which is pivot-mounted with respect to the bracket. A novel actuator linkage is coupled to and pivoted by the drive shaft and extends between the drive shaft and the sensor stem. In a specific embodiment, the linkage includes a connector driven by the drive shaft and a first link pin-coupled to the connector for pivoting about a first link axis. A second link is pivot-coupled to the first link and such second link drives a torque pin which imparts rotary motion to the pot stem when the pedal is moved and the linkage is pivoted by pedal movement. In a specific embodiment, the second link rotates with respect to the stem axis and in unison with the stem.

The first and second links each have spaced-apart distal and proximal ends and the following aspect of the invention is described in the order in which force "flows," i.e., is transmitted from the drive shaft to the pot stem. The actuator bar is rigidly attached to the drive shaft which, in turn, is coupled in driving engagement with a linkage connector. The proximal end of the first link is pivot-coupled to the connector and the distal end of such link is pivot-coupled to the distal end of the second link. The proximal end of the second link is coupled to the stem for stem rotation.

In another aspect of the invention, the new apparatus is configured to drive a sensor of a particular type, i.e., one in which the sensor stem includes a slot. The apparatus includes a sensor mounting device which is fixed to the bracket and has a face on which the sensor is mounted. The device has a tube extending toward the second link.

In addition to the connector and first and second links mentioned above, the actuator linkage includes a torque pin in the tube and extending between the stem and the second link. The torque pin has a driven end torque-coupled to the second link and has a sensor driving end coupled to the sensor stem. In a specific embodiment, the sensor driving end has a tongue which engages a slot in the stem. (The torque pin is so named because torque is applied to such pin by the second link and, in turn, the pin applies torque to the pot stem.)

It is desirable to have some sort of mechanical "stop" or "stops" which limit travel of the accelerator pedal and of apparatus components between an idle position and a maximum engine speed position. Accordingly, in a highly preferred embodiment, the apparatus mounting bracket includes an aperture having first and second boundary edges. A pin extends through the connector, through the first link and into the aperture and contacts the first boundary edge when the pedal is in the idle position. Such pin contacts the second boundary edge when the pedal is in the maximum-speed position.

As in a vehicle having a mechanical linkage to a carburetor, it is also desirable in the new apparatus to have the accelerator pedal biased to the idle position when such pedal is not in use. For that purpose, a preferred embodiment includes a biasing spring extending between the aforedescribed pin and a spring anchor point. Most preferably, the apparatus includes plural, i.e., redundant, biasing springs extending between the pin and the anchor point.

It will be recalled from the foregoing that the actuator bar is connected to a drive shaft which is pivot-mounted with respect to the bracket. In another inventive aspect of the new vehicular accelerator pedal apparatus, the drive shaft rotates with respect to a shaft axis and such axis is spaced from and parallel to the stem axis of rotation. And when the actuator bar and the drive shaft move from the idle position to the maximum speed position, the drive shaft rotates in a first direction and the stem rotates in a second direction opposite that of the first direction.

The foregoing description mentions a drive shaft connected to the pedal actuator bar and also mentions a pin which pivot-couples the connector and the first link to one another. The pin has a long axis and when the accelerator pedal is depressed and the actuator bar moved from the idle position to the maximum speed position, the drive shaft rotates through a shaft arc of X degrees. And when the actuator bar moves from the idle position to the maximum speed position, the pin long axis moves and defines a pin arc of X degrees. (The value of X depends upon the configuration of a particular apparatus and is likely to be in the range of from 5° to 35°–40° or so. In a specific apparatus, X is preferably in the range of from 15° to 25° and, most preferably, is 20°.)

Other details of the new vehicular accelerator pedal apparatus are set forth in the following detailed descriptions and in the drawings.

DETAILED DESCRIPTIONS OF PREFERRED EMBODIMENTS

Figure 9:
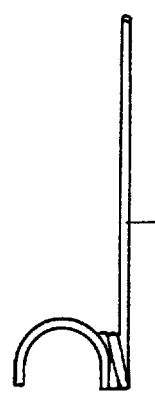
FIG. 9 is an end elevation view of the spring of FIG. 8 taken along the viewing axis VA9 thereof.
Figure 8:
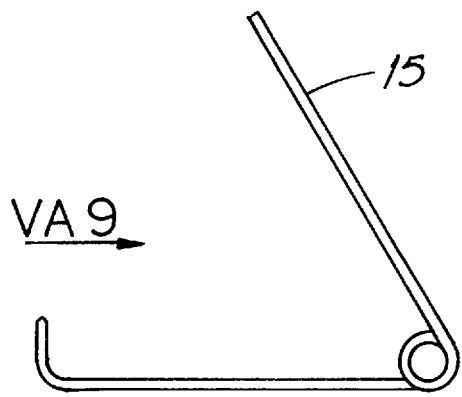
FIG. 8 is a side elevation view of the pedal biasing spring of the apparatus.
Figure 18:
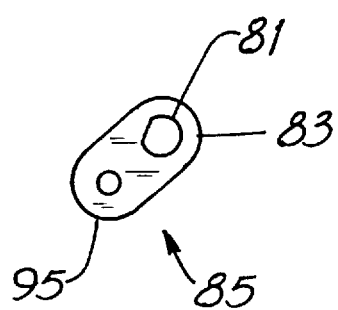
FIG. 18 is an elevation view of the second link of the apparatus.

Referring to FIGS. 1 through 7, the new vehicular accelerator pedal apparatus 10 will be described starting with the speed-controlling "input" device, i.e., the accelerator pedal 11, and ending with a description of how any one of different sensors, a signal output device, are readily used as part of such apparatus 10. The apparatus 10 includes a foot pedal 11, the mounting bracket of which is pin-attached to a rigid actuator bar 13. For easy contact by a driver's foot, the pedal 11 is biased by a wire spring 15 (shown in FIGS. 4, 8 and 9) to a clockwise position (as viewed in FIG. 4) with respect to the bar 13.

A frame or bracket 17 is provided for mounting the components described below and such bracket 17 is attached to the vehicle fire wall using bolts or the like extending through the holes 19. The actuator bar 13 is bent at about a 90° angle at the location 21 to form a drive shaft 23 which is pivot-mounted with respect to the bracket 17. That is, the shaft 23 is journalled in bearings retained in the bracket 17.

Figure 3:
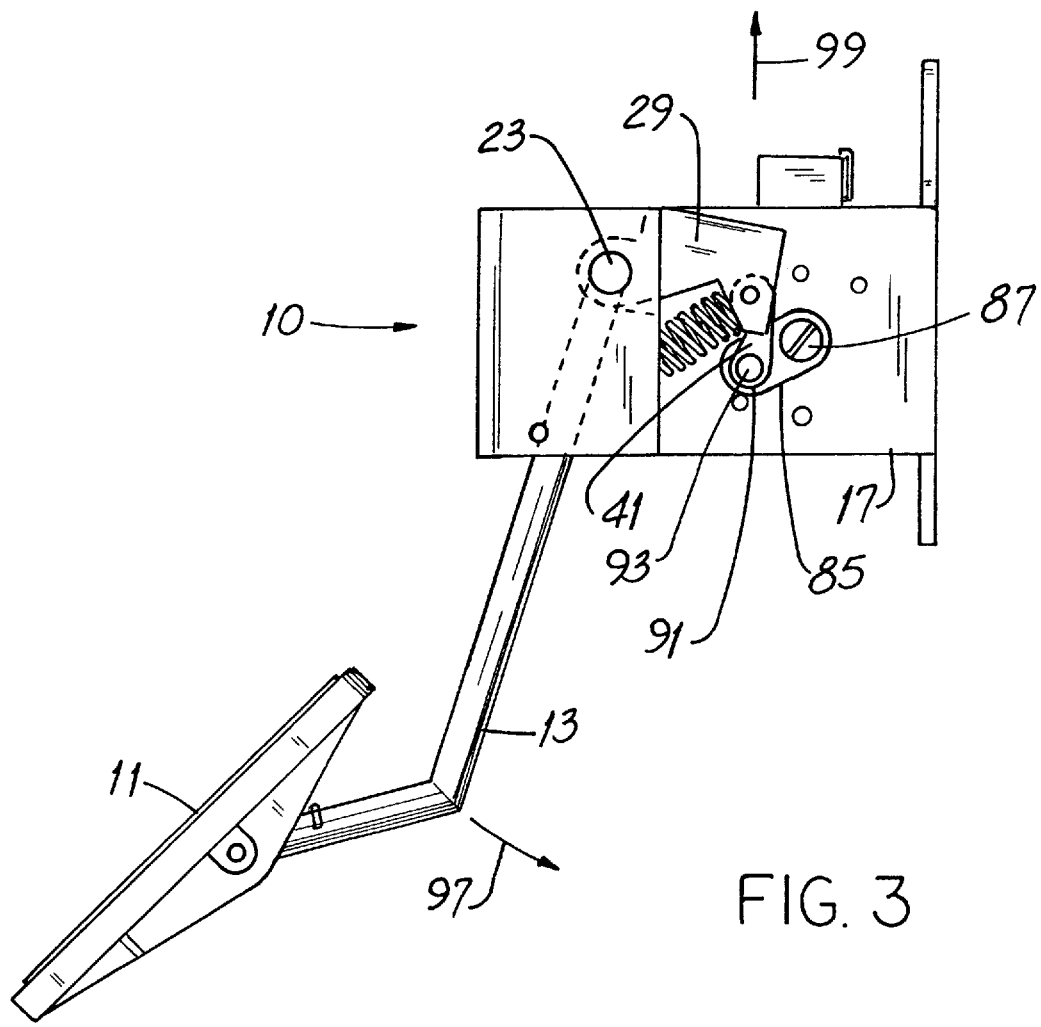
FIG. 3 is a side elevation view of the apparatus of FIG. 1 taken along the viewing axis VA3 thereof. Surfaces of parts are shown in dashed outline.
Figure 4:
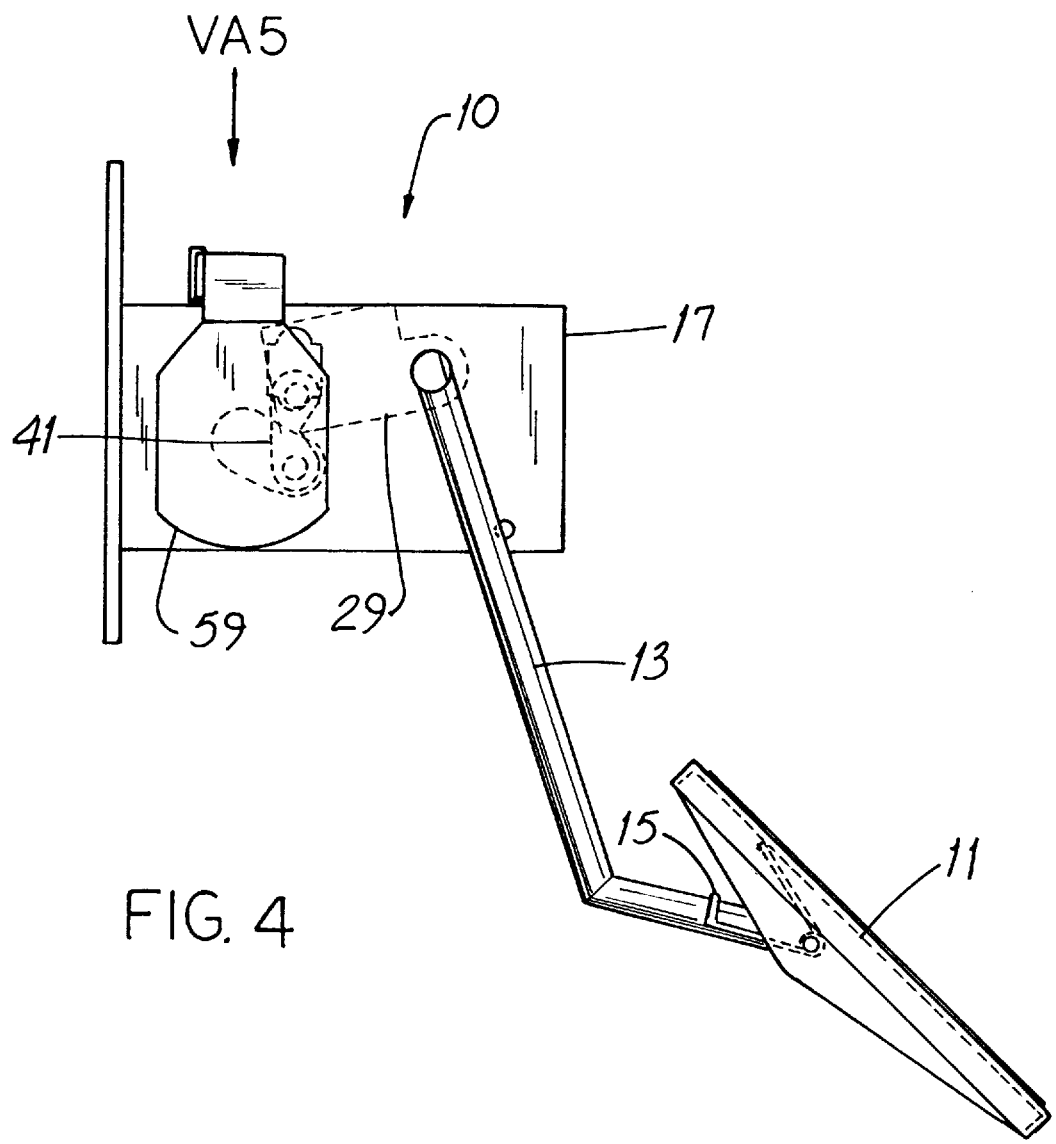
FIG. 4 is a side elevation view of the apparatus of FIG. 1 taken along the viewing axis VA4 thereof. Surfaces of parts are shown in dashed outline.
Figure 6A:
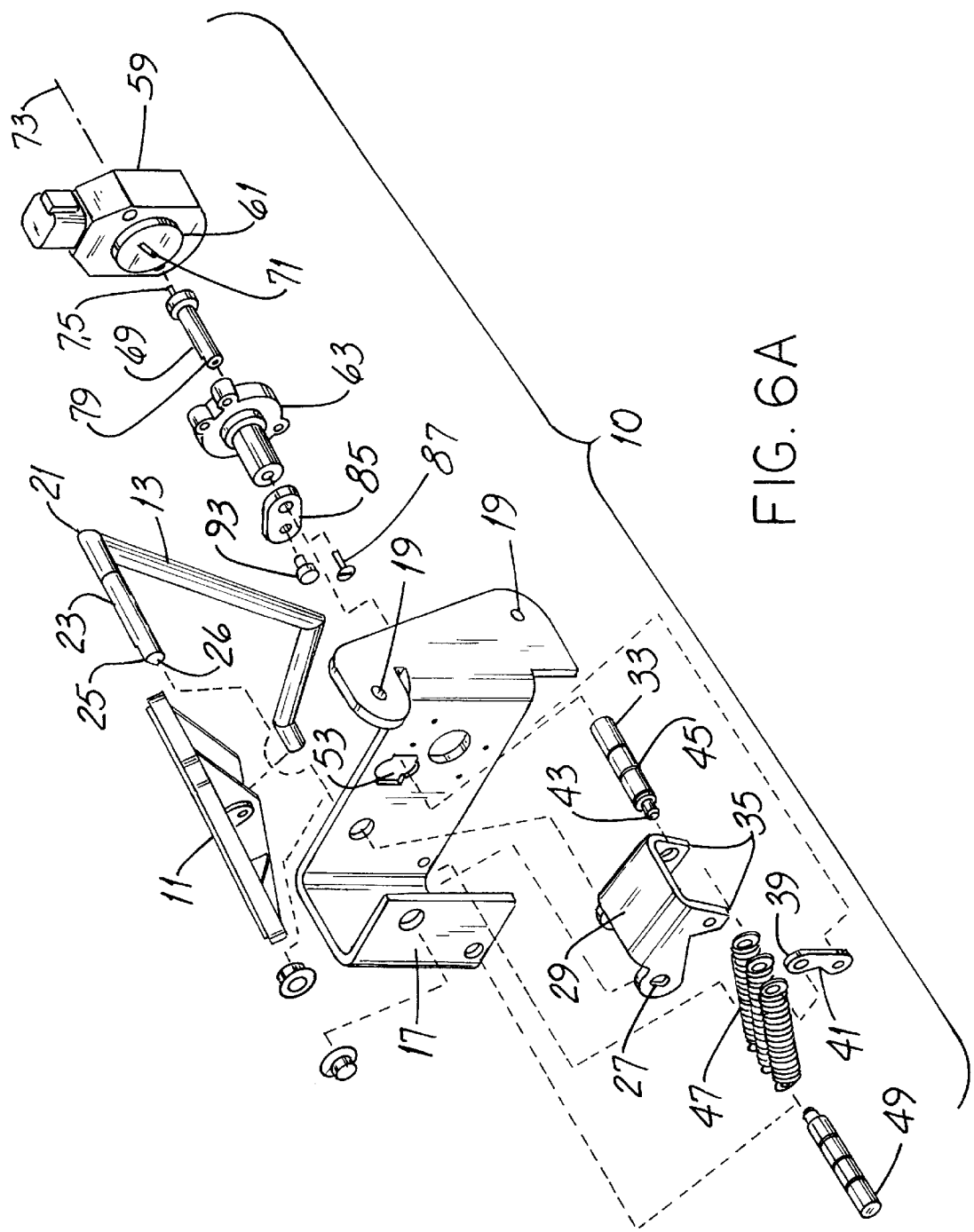
FIG. 6A is an exploded perspective view of most of the parts of the apparatus of FIG. 1.
Figure 13:
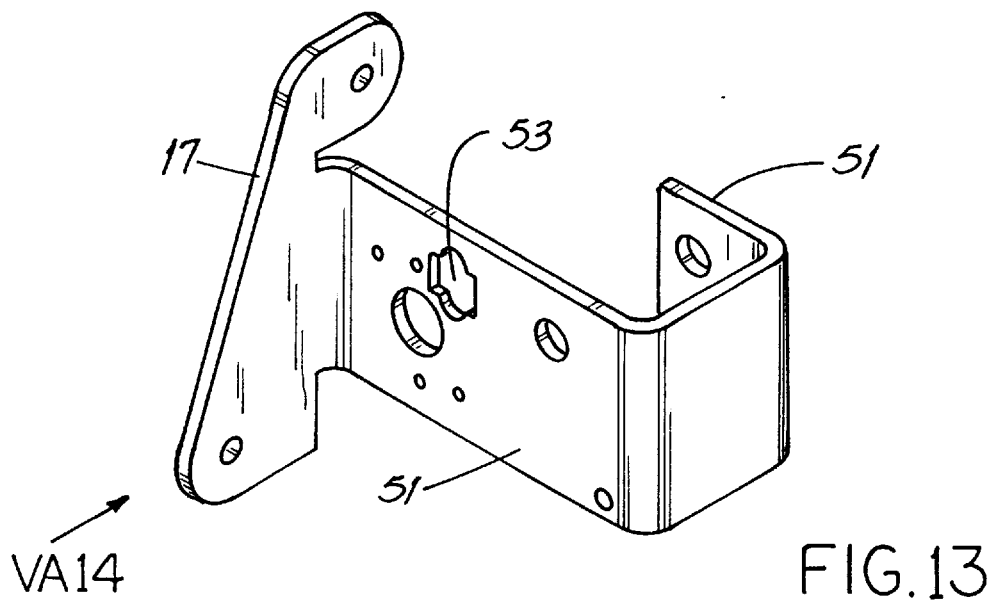
FIG. 13 is a perspective view of the bracket of the apparatus.
Figure 6B:
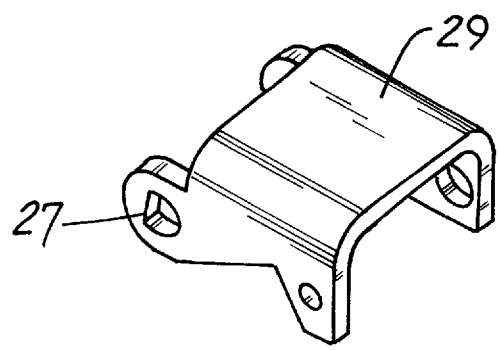
FIG. 6B is a perspective view of the apparatus Connector shown in FIG. 6A.
Figure 7:
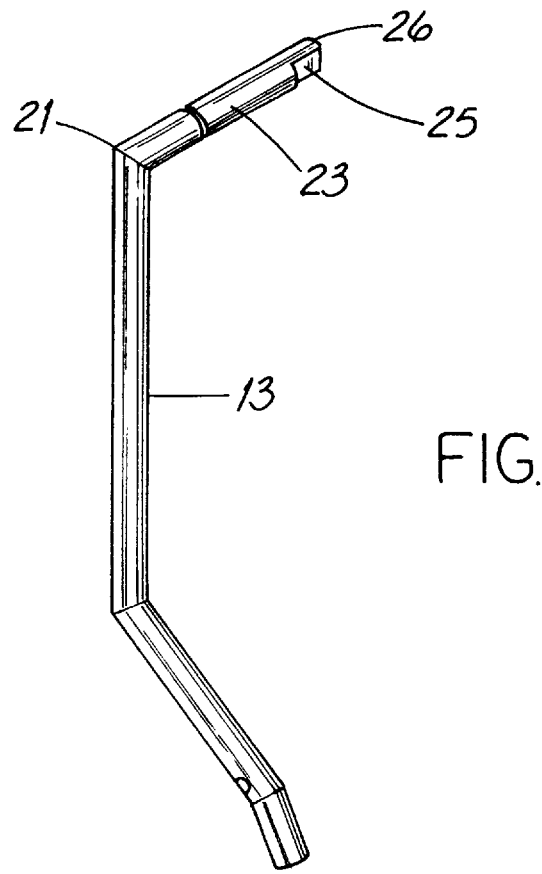
FIG. 7 is a perspective view of the actuator bar and integral drive shaft of the apparatus.
Figure 10:
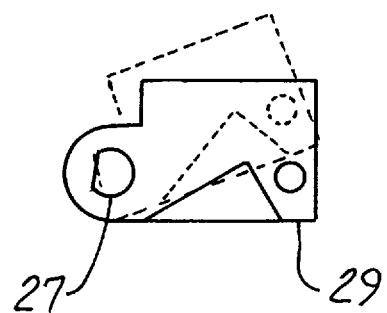
FIG. 10 is a side elevation view of the connector of the apparatus showing in solid outline its position when the accelerator pedal is at the idle position and showing in dashed outline its position when the accelerator pedal is at a high-engine-speed position.

As shown in FIGS. 2, 6A, 6B and 7, the shaft 23 (which is otherwise cylindrical) has a flat surface 25 formed thereon and the resulting D-shaped end 26 conforms in size and shape to a D-shaped drive hole 27 in the U-shaped connector 29 shown in FIGS. 6A, 6B and 10. The end 26, 23 is in the hole 27 and when the pedal 11 is depressed to rotate the shaft 26, 23 counterclockwise (as seen in FIG. 3—or clockwise as seen in FIG. 4) about the shaft axis 31, the connector 29 pivots in the same direction about the same axis 31.

Referring next to FIGS. 5, 6A, 6B, 11 and 12, a connector pin 33 extends through both lugs 35 of the connector 29 and through an aperture 37 in the proximal end 39 of a first link 41 positioned between the lugs 35. The pin 33 is held in position in the connector 29 by the pin shoulder 43 on one side of a lug 35 and by a retaining ring (not shown) on the other.

Figure 11:
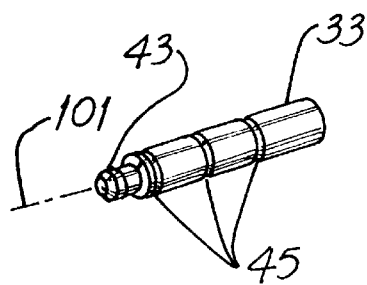
FIG. 11 is a perspective view of the connector pin of the apparatus.
Figure 14:
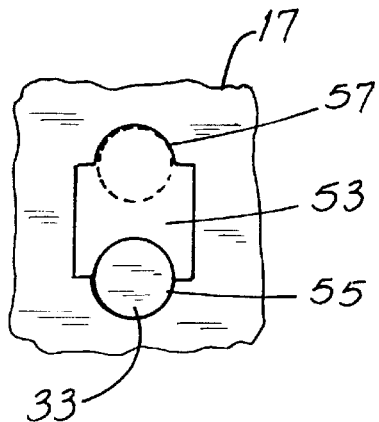
FIG. 14 is a side elevation view taken along the viewing axis VA14 of FIG. 13 and showing a portion of the bracket, also showing in solid outline the position of the pin of FIG. 11 when accelerator pedal is at the idle position and also showing in dashed outline the position of such pin when the accelerator pedal is at a high-engine-speed position.
Figure 15:
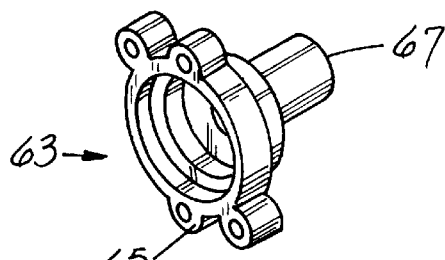
FIG. 15 is a perspective view of the sensor mouting device of the apparatus.
Figure 16:
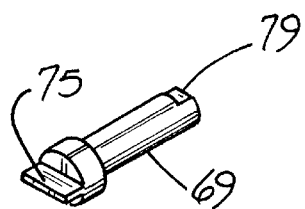
FIG. 16 is a perspective view of the torque pin of the apparatus.
Figure 17:
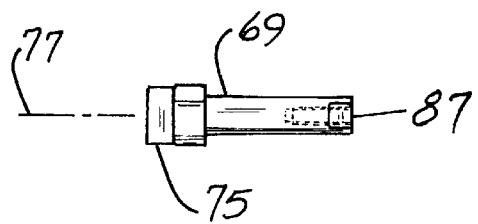
FIG. 17 is a side elevation view of the torque pin of the apparatus. Surfaces are shown in dashed outline.
Figure 19:
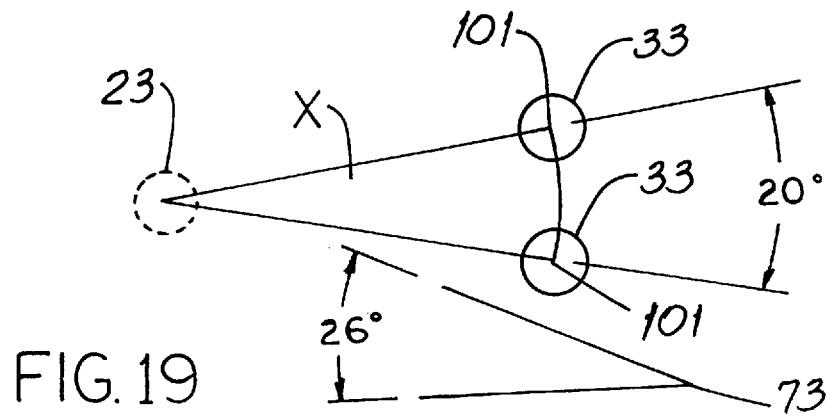
FIG. 19 is a representation of drive shaft and pin axis movement and the resulting angular movement of the sensor stem when a second link of a particular length is used in the apparatus.

As shown in FIGS. 6A, 6B and 11, the pin 33 has three spaced-apart circumferential grooves 45, each receiving one hook end of a respective biasing spring 47 in tension. The other hook end of each spring 47 is attached to a spring anchor point embodied as an anchor bar 49 extending through the spaced legs 51 of the bracket 17. The pedal 11, actuator bar 13 and drive shaft 23 (as well as other components coupled directly or indirectly to the shaft 23) are biased to an engine idle position (see FIGS. 2 and 3) by the springs 47 which are redundant as to one another.

Referring particularly to FIGS. 2, 6A, 6B, 13 and 14, the bracket 17 includes a generally-elliptical aperture 53 having first and second boundary edges 55 and 57, respectively. The pin 33 is of sufficient length to extend into such aperture 53 and when the pedal 11 is in the idle position, the pin 33 contacts the first boundary edge 55 as shown in solid line in FIG. 14. And when the pedal 11 is in a maximum-speed position, the pin 33 contacts the second boundary edge 57 as shown in dashed outline in FIG. 14. From the foregoing, it is apparent that the pin 33 and the edges 55, 57 coact to limit travel of the pedal 11 between the idle position and the maximum speed position.

Before describing how the connector 29 is link-coupled to the electrical sensor 59, it will be helpful to have an understanding of how the sensor 59 is mounted and how its rotary stem 61 is configured. Referring next to FIGS. 2, 5, 6A, 6B, 15, 16 and 17, the apparatus 10 includes a sensor mounting device 63. The device 63 has a ring-like face 65 against which the sensor 59 is mounted and both the device 63 and the sensor 59 are secured to the bracket 17 by bolts or the like. The device 63 has a hollow, cylindrical tube 67 which extends away from the sensor 59 and such tube receives a torque pin 69, the function of which is explained below.

The sensor stem 61 has a slot 71 formed in it and located to be coincident with the stem axis of rotation 73. One end of the torque pin 69 includes a flat tongue 75 coincident with the pin long axis 77 and when the apparatus 10 is fully assembled, the tongue 75 is in the slot 71. Thus, rotation of the pin 69 rotates the stem 61. The other end of the torque pin 69 has a flat surface 79 formed on it and the resulting D-shaped end conforms in size and shape to a D-shaped drive opening 81 in the proximal end 83 of the second link 85 shown in FIGS. 1, 3, 6A, 6B and 18.

Figure 1:
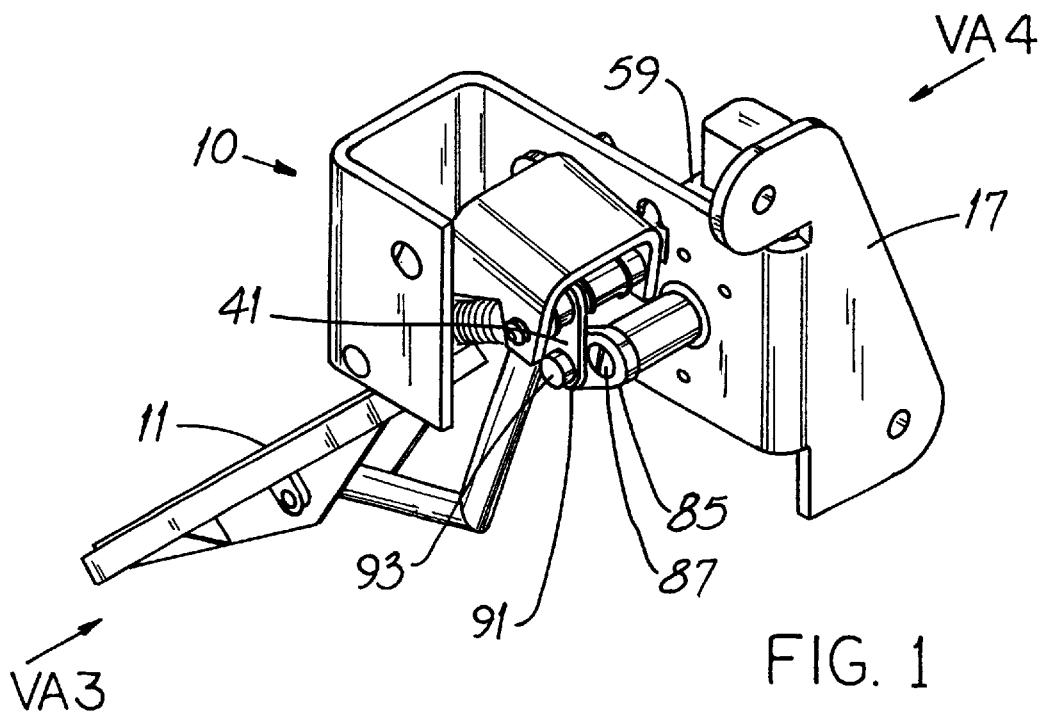
FIG. 1 is a perspective view of the new vehicular accelerator pedal apparatus.
Figure 5:
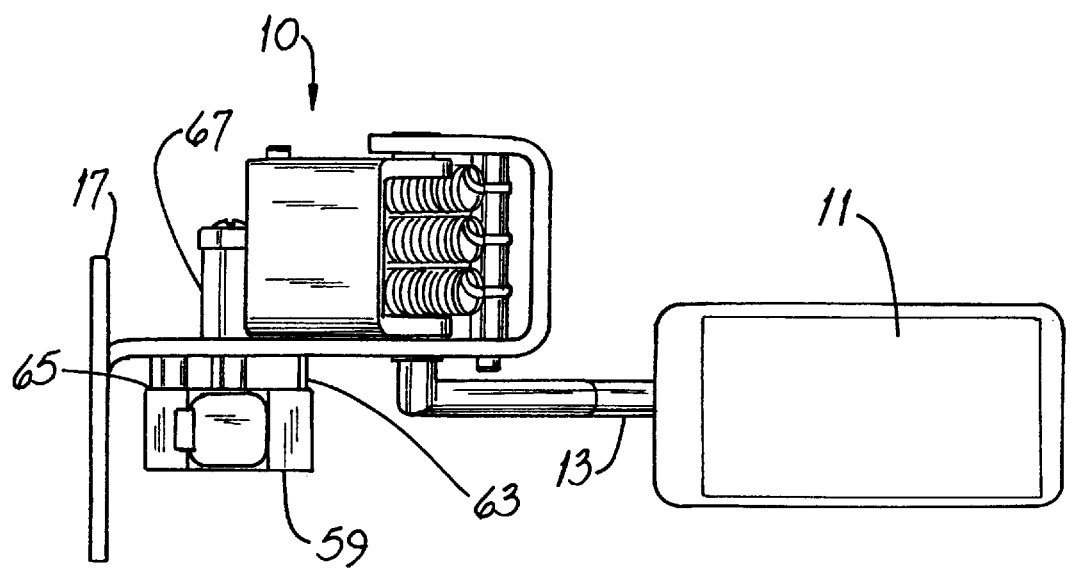
FIG. 5 is a top plan view of the apparatus of FIG. 1 taken along the viewing axis VA5 of FIG. 4.
Figure 2:
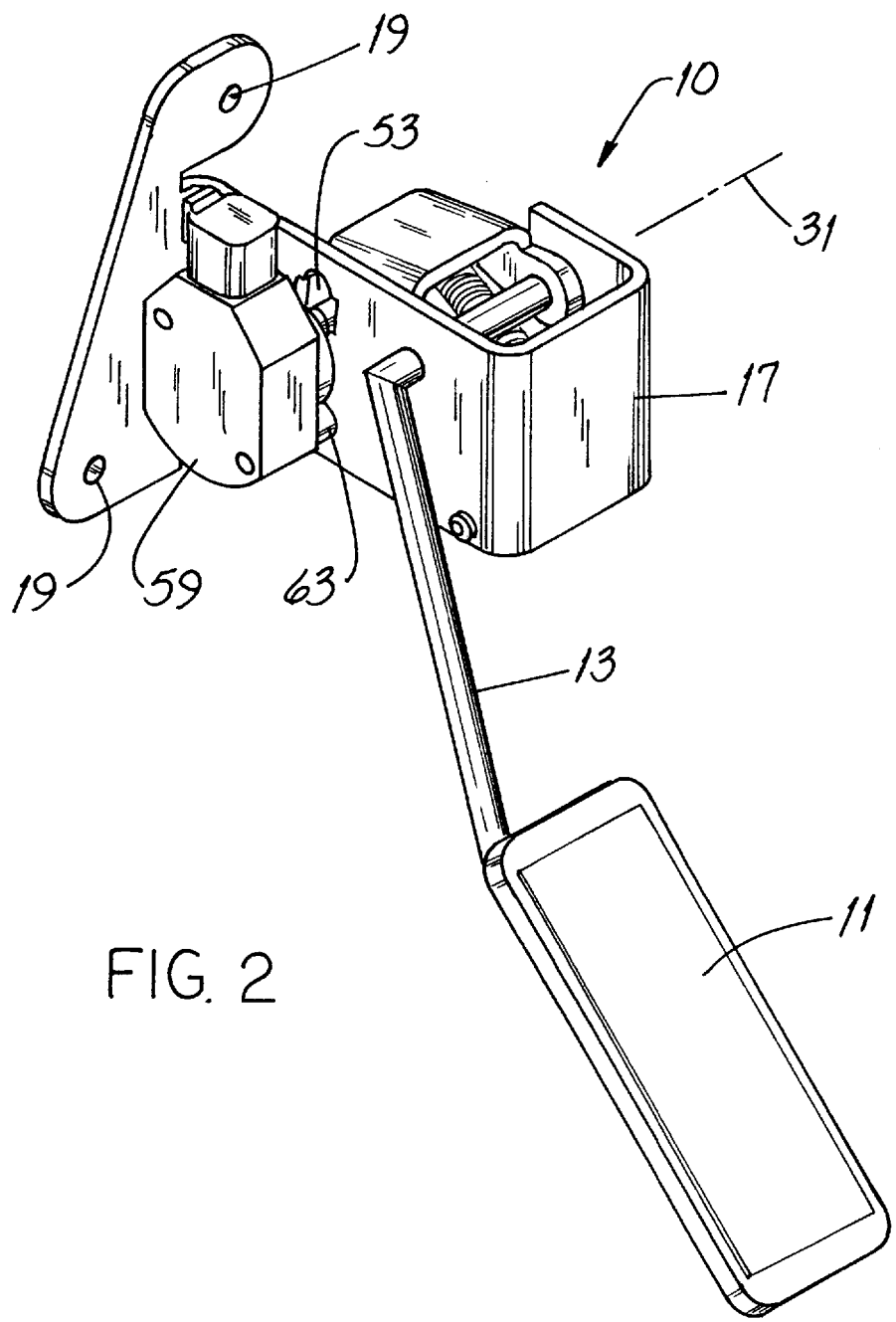
FIG. 2 is another perspective view of the apparatus of FIG. 1.
Figure 12:
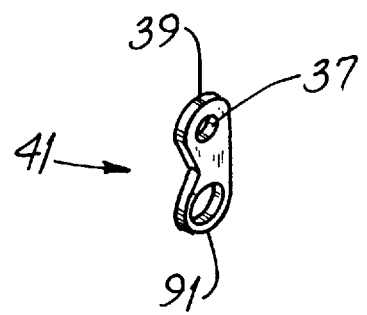
FIG. 12 is a perspective view of the first link of the apparatus.

The end and the opening are retained in engagement with one another by a screw 87 threaded into a tapped hole in the pin 69. When the link 85 is pivoted about the stem axis 73, the stem 61 pivots in the same direction about the same axis 73 and through the same arc. As shown in FIGS. 1, 3 and 12, the distal end 91 of the first link 41 is pivot-coupled by a pivot pin 93 to the distal end 95 of the second link 85.

Considering the foregoing, in operation, the apparatus 10 is assumed to be at the engine idle position shown in FIGS. 1, 3 and 4. In such position, the biasing springs 47 urge the connector 29 and links 41, 85, to their respective positions. Absent spring-overpowering force applied to the pedal 11, such connector 29 and links 41, 85 are retained in such positions by the pin 33 bearing against the first boundary edge 55.

Considering FIGS. 3 and 10, when the pedal 11 is depressed to accelerate the vehicle engine, the actuator bar 13 moves in the direction of the arrow 97. The drive shaft 23 and connector 29 rotate in a first direction, e.g., counterclockwise, and the first link 41, being pivotably attached to the connector 29 by the pin 33, moves generally upwardly in the direction of the arrow 99. Movement of the link 41 causes the second link 85 (and the torque pin 69 and sensor stem 61 coupled to such link 85) to rotate in a second direction, e.g., clockwise, in the view of FIG. 3. Thus, the electrical output of the sensor 59 changes.

The pin 33 has a longitudinal axis 101 and from FIGS. 3, 10, 19 and 20, it will be appreciated that when the accelerator pedal 11 is depressed and the actuator bar 13 moved from the idle position to the maximum speed position, the drive shaft 23 rotates through a shaft arc of X degrees. In a very specific apparatus, X is 20°. As the drive shaft 23 rotates, the pin long axis 101 moves translationally and defines a pin arc of X degrees.

It has long been known that while movement of an accelerator pedal 11 and bar 13 is limited to, say, 20° or so, commonly-used sensors 59 have a stem 61 which must be rotated through a significantly greater angle in order to provide a full range of engine-speed-controlling output signals. And the maximum stem rotation angle differs from sensor to sensor. For example, the sensor stem rotation angle may vary from about 55° to about 100° or so, depending upon the particular make and model of sensor in question.

Figure 20:
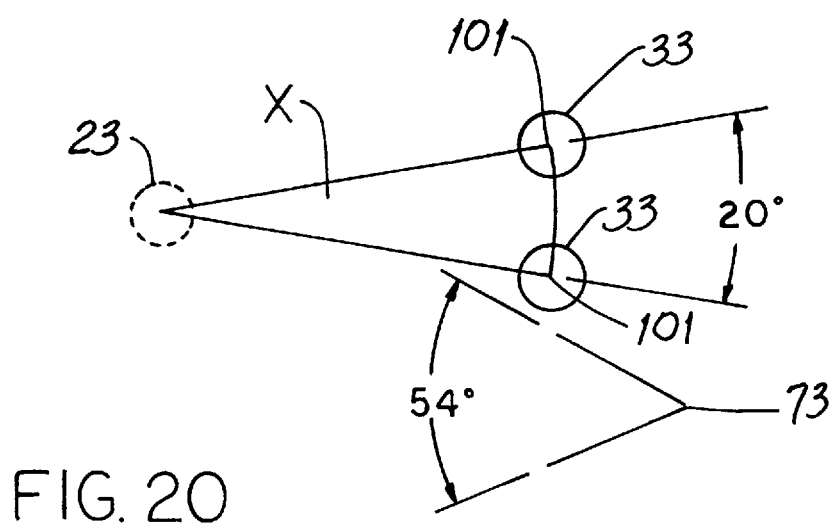
FIG. 20 is a representation of drive shaft and pin axis movement and the resulting greater angular movement of the sensor stem when a longer second link is used in the apparatus.

An advantage of the new apparatus 10 is that it is very easily configured to accommodate any one of the different sensors now in common use. Considering FIG. 10 and the representation of FIG. 19 and using a second link 85 of a particular length, rotation of the drive shaft 23 and connector 29 through an arc of 20° (which causes movement of the pin axis 101 through a pin arc of 20°) causes an exemplary rotation of 26° of the torque pin 69 and the stem 61 about axis 73. If a longer second link 85 is used, FIGS. 10 and 20 represent that rotation of the drive shaft 23 and connector 29 through an arc of 20° causes an exemplary rotation of 54° of the torque pin 69 and the stem 61 about axis 73. The point is that the new apparatus 10 may be configured to accommodate a variety of sensors (i.e., sensors having stems 61 requiring differing arcs of rotation) by appropriately changing the length of the link 85.

The terms "mounted for rotation," "rotary movement," "axis of rotation" and the like should not be construed to imply that, "rotation" and "rotary" mean moving through an arc of at least 360°. Rather, such terms mean that the structure is capable of some rotary movement. As used herein, the phrase "torque-coupled" means that the components which are so coupled, e.g., the torque pin 69 and the second link 85, are capable of transmitting force or torque from one to the other.

While the principles of the invention have been shown and described in connection with a few preferred embodiments, it is to be understood clearly that such embodiments are by way of example and are not limiting.

What is claimed:

1. In a vehicular accelerator pedal apparatus including (a) a pedal position sensor mounted with respect to a bracket and having a stem rotatable about an axis of rotation, (b) an accelerator pedal, and (c) an actuator bar extending from the pedal toward the bracket, the improvement wherein:

the actuator bar is connected to a drive shaft pivot-mounted with respect to the bracket;

an actuator linkage is coupled to and pivoted by the drive shaft;

the linkage extends between the drive shaft and the sensor stem;

the linkage includes a connector coupled to the drive shaft for coincident movement therewith; and the linkage also includes rigid first and second links coupled between the connector and the stem and imparting rotary motion to the stem when the linkage is pivoted by movement of the pedal;

the second link has a proximal end coupled to the stem and has a distal end spaced from the proximal end of the second link;

the first link is pivot-coupled to the distal end of the second link.

the connector extends between the drive shaft and the first link;

the first link has a proximal end and a distal end;

the proximal end of the first link is pivot-coupled to the connector; and the distal end of the first link is pivot-coupled to the distal end of the second link.

2. The apparatus of claim 1 wherein:

the accelerator pedal moves between an idle position and a maximum speed position;

the bracket includes an aperture therethrough and having first and second boundary edges;

a pin extends through the first link and through the aperture; and when the pedal is in the idle position, the pin contacts the first boundary edge and is spaced from the second boundary edge.

3. The apparatus of claim 2 wherein, when the pedal is in the maximum-speed position, the pin contacts the second boundary edge and is spaced from the first boundary edge.

4. The apparatus of claim 2 wherein the bracket includes spaced legs having an anchor bar extending therethrough and the apparatus includes a biasing spring extending between the pin and the anchor bar, thereby biasing the pedal to the idle position.

5. In a vehicular accelerator pedal apparatus including (a) a pedal position sensor mounted with respect to a bracket and having a stem mounted for rotation about an axis of rotation, (b) an accelerator pedal, and (c) an actuator bar attached to the pedal and extending toward the bracket, the improvement wherein:

the actuator bar is connected to a drive shaft angularly attached to the actuator bar and pivot-mounted with respect to the bracket;

the drive shaft rotates with respect to a shaft axis;

an actuator linkage is coupled between the drive shaft and the stem and includes a connector driven by the drive shaft for pivoting movement about the shaft axis;

the shaft axis is spaced from and parallel to the stem axis of rotation and when the connector pivots in a first direction about the shaft axis, the stem rotates in a second direction about the stem axis.

6. The apparatus of claim 5 wherein the actuator linkage includes:

a first link which pivots about a first link axis; and a second link which is pivot-coupled to the first link and rotates in unison with the stem.

7. The apparatus of claim 5 wherein:

the actuator bar is mounted for movement between an idle position and a maximum speed position;

the actuator linkage includes a pin pivot-coupling the connector and a first link to one another;

the pin has a longitudinal axis;

and wherein, when the actuator bar is moved from the idle position to the maximum speed position:

the drive shaft rotates through a shaft arc of X degrees; and the pin moves translationally and the pin longitudinal axis defines a pin arc of X degrees.

8. The apparatus of claim 7 includes a biasing spring extending between the pin and a spring anchor bar spaced from the pin and from the sensor stem, thereby biasing the actuator bar to the idle position.

9. The apparatus of claim 7 wherein:

the apparatus includes a sensor mounting device fixed to the bracket and having the sensor mounted thereon;

the actuator linkage includes a second link pivot-coupled to the first link;

the actuator linkage includes a torque pin extending between the sensor stem and the second link; and the torque pin has a driven end torque-coupled to the second link and has a sensor driving end coupled to the stem.

10. In a vehicular accelerator pedal apparatus including (a) a pedal position sensor mounted with respect to a bracket and having a stem mounted for rotation about an axis of rotation, (b) an accelerator pedal, and (c) an actuator bar attached to the pedal and extending toward the bracket, the improvement wherein:

the actuator bar is connected to a drive shaft pivot-mounted with respect to the bracket;

the drive shaft rotates with respect to a shaft axis;

an actuator linkage is coupled between the drive shaft and the stem;

the shaft axis is spaced from and parallel to the stem axis of rotation;

the actuator bar is mounted for movement between an idle position and a maximum speed position;

and wherein, when the actuator bar is moved from the idle position to the maximum speed position:
the drive shaft rotates in a first direction; and
the stem rotates in a second direction.

11. The apparatus of claim 10 wherein the actuator linkage includes:

a first link which pivots about a first link axis; and a second link which is pivot-coupled to the first link and rotates in unison with the stem.

12. In a vehicular accelerator pedal apparatus including (a) a pedal position sensor mounted with respect to a bracket and having a stem rotatable about an axis of rotation, (b) an accelerator pedal mounted for movement between an idle position and a maximum-speed position, and (c) an actuator bar extending from the pedal toward the bracket, the improvement wherein:

the actuator bar is connected to a drive shaft pivot-mounted with respect to the bracket;

an actuator linkage is coupled to and pivoted by the drive shaft;

the linkage extends between the drive shaft and the sensor stem;

the linkage includes a connector coupled to the drive shaft for coincident movement therewith;

the linkage also includes rigid first and second links coupled between the connector and the stem and imparting rotary motion to the stem when the linkage is pivoted by movement of the pedal;

the bracket includes an aperture therethrough and having first and second boundary edges;

a pin extends through the first link and through the aperture;

the pin contacts the first boundary edge when the pedal is in the idle position;

the bracket includes spaced legs having an anchor bar extending therethrough; and the apparatus includes a biasing spring extending between the pin and the anchor bar, thereby biasing the pedal to the idle position.

* * * * *